Figure 1:
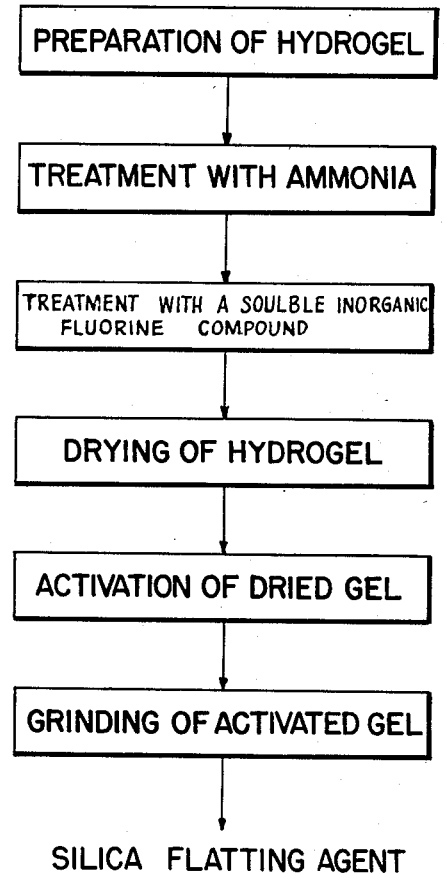

Jan. 13, 1953     L. O. YOUNG     2,625,492
SILICA FLATTING AGENT AND A METHOD OF MANUFACTURING IT
Filed June 8, 1949     2 SHEETS—SHEET 1

PREPARATION OF HYDROGEL

TREATMENT WITH AMMONIA

TREATMENT WITH A SOULBLE INORGANIC FLUORINE COMPOUND

DRYING OF HYDROGEL

ACTIVATION OF DRIED GEL

GRINDING OF ACTIVATED GEL

SILICA FLATTING AGENT

INVENTOR.
LUTHER OMAN YOUNG
BY
Semmes, Keegin, Robinson & Semmes
ATTORNEYS

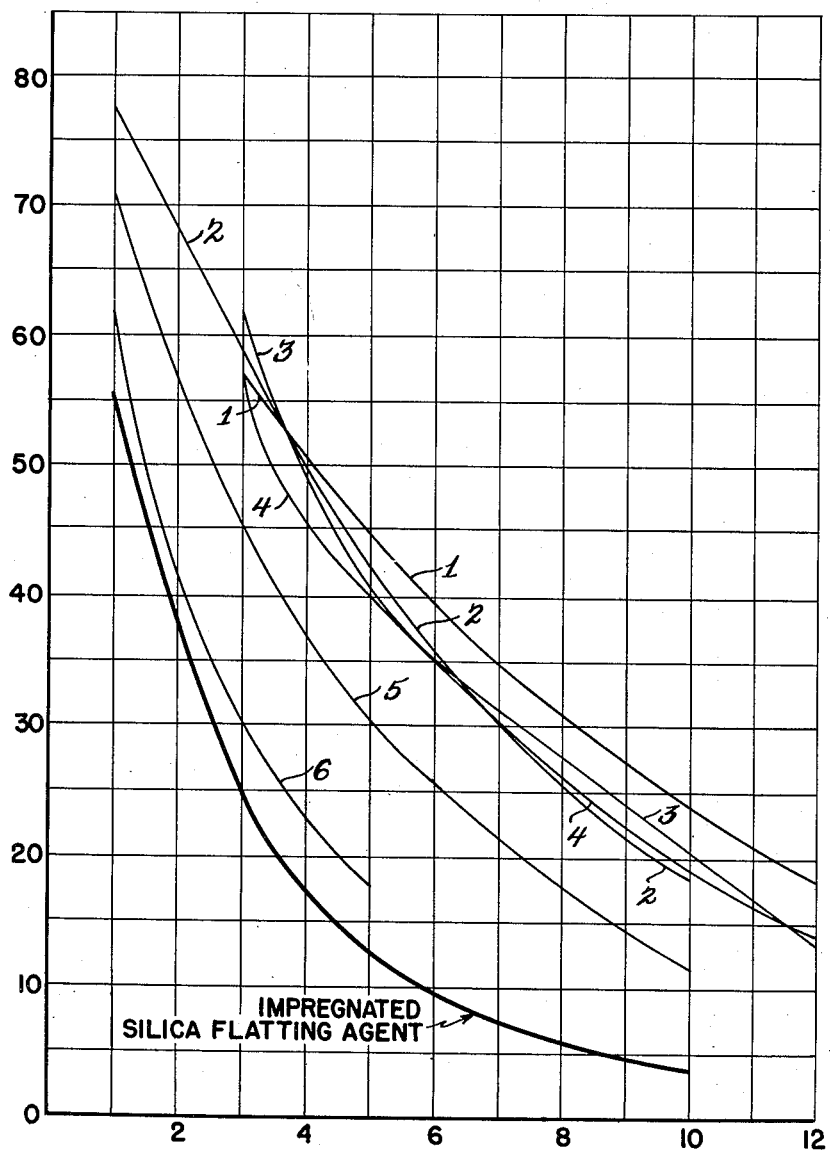

Patented Jan. 13, 1953

2,625,492

UNITED STATES PATENT OFFICE

2,625,492

SILICA FLATTING AGENT AND A METHOD OF MANUFACTURING IT

Luther Oman Young, Baltimore, Md., assignor to The Davison Chemical Corporation, Baltimore, Md.

Application June 8, 1949, Serial No. 97,814

7 Claims. (Cl. 106—308)

This invention relates to a silica flatting agent, and more particularly to an improved silica flatting agent characterized particularly by its non-hard-settling properties when used in lacquers.

Flatting agents are extensively used in many fields to reduce the gloss of a surface. Typical uses of flatting agents are in photographic emulsions, printing inks, lacquers and varnishes. This invention will be described in relation to the preparation of a new silica flatting agent used in lacquers, but it is not limited to that particular application of the invention. The silica flatting agent comprising this invention is highly efficient as a flatting agent in any of the usual situations where a flatting agent is desirable.

One of the principal objections to the flatting agents hitherto available is their tendency to cake or hard-settle. When a can of lacquer is stored, a heavy, semi-solid material settles in the bottom of the can. Before the lacquer may be used, the settled material must be dispersed through the lacquer. It is often necessary to pour some of the lighter fluid overlying the caked material from the can and stir the caked material with a suitable paddle. The light fluid is then added back to the solid material with constant stirring to obtain a uniform dispersion of the caked material throughout the lacquer. Often the material cakes so hard that it is impossible to obtain a satisfactory dispersion.

It is an object of this invention to provide an improved silica flatting agent.

Another object of this invention is to provide a silica flatting agent suitable for use in lacquers which does not cake or hard-settle on storage of the lacquers.

A further object of this invention is to provide a method of treating silica hydrogel to produce an improved silica flatting agent.

Still another object of this invention is to provide a silica flatting agent having improved gloss reduction properties.

With these and other objects in view, as will become apparent in the following detailed description, this invention resides in the treatment of a silica hydrogel with a fluorine-containing compound to produce an improved silica flatting agent.

In the drawings:

Figure 1 illustrates a flow sheet showing the preferred method of preparing the silica flatting agent of this invention; and, Figure 2 is a chart showing the effectiveness of the new silica flatting agent compared with competitive materials.

The silica flatting agent of this invention is prepared from silica hydrogel. The silica hydrogel used as a starting ingredient may vary widely in its silica content, and may range from the very low silica hydrogels of about 6% or 7% silica to the high silica hydrogels of 17%, or more, silica. No particular method of preparing the hydrogel is required and ordinarily the usual method of preparing a hydrogel by the neutralization of an alkaline silicate solution with an acid is used.

The silica hydrogel is treated by passing an ammonia-containing solution in contact with the gel. Ordinarily, contact between the hydrogel and ammonia is obtained by circulating the solution over the gel until the gel has absorbed the required amount of ammonia. Ammonia is strongly absorbed by the hydrogel, making it possible to use ammonia-containing solutions of widely varying concentrations and prepared from a wide variety of ammonia-containing compounds. Thus, the solution passed in contact with the hydrogel may be a weak ammonia water or other alkaline solutions, as for instance, extremely dilute solutions of alkali, carbonates or hydrates.

In order to produce the improved silica flatting agent, the silica hydrogel is treated with a fluorine-containing compound. The usual method of treating the hydrogel with the fluorine-containing compound is to pump an aqueous solution of the fluorine-containing compound continually over the hydrogel particles until the required concentration of fluorine is obtained in the gel. While the preferred method of preparing the improved flatting agent is to wash the hydrogel with an ammonia-containing solution prior to the treatment with the fluorine-containing solution, this order of procedural steps is not critical and the silica may be treated with the fluorine-containing compound at other stages of the operation. For example, the silica hydrogel may be treated with a fluorine-containing compound either before or after the hydrogel is washed with ammonia.

The contacting of the silica hydrogel with a fluorine-containing compound is continued until the fluorine content of the gel is about 0.5%, on a dry basis. At this concentration of fluorine, the non-caking characteristics of the flatting agent are greatly improved. Whereas ordinary silica gel, when employed as a flatting agent in lacquers will form a hard cake, the material containing 0.5% fluorine forms only a medium hard cake. If the fluorine concentration is increased to about 0.8%, the performance improves. The non-hard-settling characteristics of the silica are retained throughout the range of about 0.8% to 1.6% fluorine. The upper limit of fluorine concentration is determined by economic considerations rather than the concentration necessary to obtain the desired non-caking properties. Concentrations above 1.6% fluorine may be employed, but do not cause any improvements in the properties of the flatting agent.

A large number of fluorine-containing compounds may be used in the preparation of the flatting agent. One compound that has been found to be particularly suitable is magnesium fluosilicate. Other fluorine-containing compounds which might be used are hydrofluosilicic acid, hydrofluoric acid, and any soluble fluorides or fluosilicates, such as, for instance, sodium or potassium fluoride, zinc or ammonium fluosilicate, etc.

The fluorine impregnated hydrogel is dried in a conventional drier to a moisture content suitable for charging the hydrogel to activation equipment. Tray driers, shelf driers of the Hereshoff type, and rotary driers may be used in the drying operation. The particular type of drier and the moisture content to which the material is dried are not critical, but it is only necessary to produce a dry gel which may be handled satisfactorily in the activation equipment. Practical consideration, such as ease of handling, rather than the actual moisture content, determine the extent of the drying.

After drying, the gel is activated by heating to a relatively high temperature. Here again the equipment employed for the activation step is not critical nor is the activation temperature. A primary concern in the activation step is to produce an activated gel which may be ground to the desired size for use as a flatting agent without requiring re-activation or re-drying after the grinding step. Thus, the degree of activation is determined largely from the practical operating difficulties encountered in activating finely ground material.

The activated product is ground to the desired particle size which, of course, will depend upon the use at which the flatting agent is put. The particular method or apparatus used in grinding the activated fluorine-containing silica is not critical. A highly satisfactory flatting agent has been obtained by grinding the activated silica in a fluid energy mill operated with superheated steam or compressed air. A high speed mixer, such as a Waring blender which grinds by shear has also been found to be satisfactory.

The following example describes in detail a particular method used in preparing a silica flatting agent according to this invention. It is to be understood that the example is merely for illustration, and the invention is not limited to the exact process described.

A 32.5 Bé. sodium silicate solution was mixed with a 36° Bé. solution of sulfuric acid. The mixture formed a 17% silica hydrosol which set to a hydrogel in about one hour. The silica hydrogel, after breaking it up, was washed by passing an ammonia water solution having a pH of about 9 through the hydrogel for about forty-five hours, and the ammonia water was then allowed to drain from the hydrogel. The total volatile matter (T. V.) in the hydrogel after treatment with ammonia was about 70% and the bulk density of the dried ammoniated gel was 0.49 gram per cc.

The silica hydrogel which has been treated with the ammonia solution was contained in a suitable vessel having means permitting the liquid to be drained therefrom. An about 3% solution of $MgSiF_6 \cdot 6H_2O$ was pumped into the vessel containing the hydrogel and was then circulated through the hydrogel for about three hours. The treated hydrogel was then allowed to drain for two hours.

The fluorine impregnated silica hydrogel was placed on metal trays and dried at a temperature of 250° F. for seven hours. The T. V. of the silica gel was reduced in the drying operation to about 17.9%.

The dried silica gel was passed through a rotary calciner at approximately 800° F. The T. V. in the gel was reduced in the calciner to about 3.8% to produce a product having the following analysis:

T. V. _____ 3.8%
Magnesium (dry basis) _____ 0.42%
Fluorine (dry basis) _____ 1.60%
Density _____ .36 gram per cc.

Except for traces of impurities such as $TiO_2$, $Al_2O_3$, CaO, $Fe_2O_3$, etc. the balance of the flatting agent is silica.

The silica flatting agent having the above composition was ground to the desired particle size in a micronizer. The analysis of the silica flatting agent remained unchanged during the grinding operation.

The silica flatting agent prepared according to this invention differs from the commercial silica hitherto available in physical properties as well as in its chemical composition. Ordinarily, the density of the usual silica gels of commerce is about 0.7 of a gram per cc. The silica flatting agent prepared according to this invention will generally have a density slightly less than 0.4 of a gram per cc. Ordinary commercial silica gel is hard, translucent and clear. The silica flatting agent of this invention is soft and may be easily ground in any of the conventional grinding apparatus.

The silica flatting agent prepared according to this invention also differs widely from the ordinary commercial silica gel in its water absorption characteristics. This novel flatting agent absorbs little water at low relative humidities and large amounts at very high relative humidities. The amount of moisture absorbed by the silica flatting agent increases as the relative humidity approaches 100%. A comparison of the water absorption characteristics of the product of this invention and the commercial silica gel is illustrated in Table I.

TABLE I

*Moisture absorbed—Per cent of weight of gel*

| Relative Humidity | 10 | 20 | 40 | 60 | 80 | 90 | 100 |
|---|---|---|---|---|---|---|---|
| Commercial Silica | 7.0 | 11.5 | 23 | 32 | 36 | 37 | 38 |
| F-treated $SiO_2$ | 0.5 | 1 | 1.5 | 3.5 | 9 | 25 | 106 |

The gloss reducing characteristics of the silica flatting agent described herein is greatly improved over that of the flatting agents hitherto available. The effectiveness of competitive flatting agents was measured by the Gardner procedure at various concentrations of flatting agents. The results of the test are illustrated in Figure 2 of the drawings. The improved gloss reduction of the novel flatting agent is clearly shown in Figure 2. In that figure, the curve designated by reference numeral 1 shows the gloss reducing effects of Celite 165-S, curve 2 of Metasap 537, curve 3 of zinc stearate, curve 4 of aluminum stearate, curve 5 of R-V Flat #62, and curve 6 of Santocel "C."

The most advantageous property of the improved silica flatting agent of this invention is its non-caking or non-hard-settling properties. The silica flatting agents hitherto available would, without the additions of special compounds, settle and form a hard mass in the bottom of a can of lacquer. In many instances, the mass was so hard it could not be dispersed, even though a portion of the vehicle of the lacquer were poured from the can, the hard mass loosened, and the vehicle slowly added back to the mass with constant stirring. If the silica flatting agent of this invention is employed, however, the mass settling in the bottom of the lacquer can may be dispersed merely by upending the container two or three times.

While this invention has been described in detail with respect to a particular modification of the invention, it is to be understood that the concept of this invention is not limited to those details, but is determined by the scope of the appended claims.

I claim:

1. A non-hard-settling silica flatting agent comprising silica gel impregnated with small amounts of a soluble inorganic fluorine compound, said compound being present as about 0.5 to 1.6%, calculated as fluorine, of the composition.

2. In a method of manufacturing a silica flatting agent, the steps of washing silica hydrogel with an aqueous solution of ammonia and treating the thus washed hydrogel with a soluble inorganic fluorine compound to introduce the compound into the gel in a concentration of about 0.5 to 1.6%, calculated as fluorine, on a dry basis.

3. In a method of manufacturing a silica flatting agent characterized by its non-hard-settling properties, the steps of washing a silica hydrogel with an aqueous solution of ammonia, and treating the thus ammoniated silica hydrogel with a soluble inorganic fluorine compound selected from the group consisting of sodium fluoride, potassium fluoride, ammonium fluosilicate, zinc fluosilicate, magnesium fluosilicate, hydrofluoric acid and hydrofluosilicic acid, to introduce the compound into the gel in a concentration of about 0.5 to 1.6%, calculated as fluorine, on a dry basis.

4. In a method of manufacturing a non-hard-settling silica flatting agent, the steps of washing a silica hydrogel with an aqueous solution of ammonia, and then treating the thus ammoniated hydrogel with magnesium fluosilicate, to introduce said magnesium fluosilicate into the gel in a concentration of about 0.5 to 1.6%, calculated as fluorine, on a dry basis.

5. In a method of manufacturing a non-hard-settling silica flatting agent, the steps of treating a silica hydrogel with an aqueous solution of ammonia, and then treating the ammoniated hydrogel with an about 2½%–5% solution of magnesium fluosilicate, to introduce said magnesium fluosilicate into the gel in a concentration of about 0.5 to 1.6%, calculated as fluorine, on a dry basis for about two to four hours.

6. A composition of matter characterized by remaining fluid when stored for extended periods comprising a lacquer and a silica flatting agent, dispersed in the lacquer, said flatting agent containing about 0.5 to 1.6% of a fluorine compound, calculated as fluorine.

7. A silica flatting agent comprising finely divided silica gel having a fluorine compound therein in concentrations of approximately 0.5 to 1.6%, calculated as fluorine, and a bulk density of 0.35 to 0.4 gram per cc.

LUTHER OMAN YOUNG.

REFERENCES CITED

The following references are of record in the file of this patent:

UNITED STATES PATENTS

| Number | Name | Date |
|---|---|---|
| 1,755,496 | Behrman | Apr. 22, 1930 |
| 2,302,297 | Connolly | Nov. 17, 1942 |
| 2,328,846 | Pitzer | Sept. 7, 1943 |
| 2,475,253 | Pierce | July 5, 1949 |
| 2,477,695 | Kimberlin, Jr. | Aug. 2, 1949 |